US011127943B2

(12) United States Patent
Xie

(10) Patent No.: US 11,127,943 B2
(45) Date of Patent: Sep. 21, 2021

(54) RECHARGEABLE ALKALINE METAL AND ALKALINE EARTH ELECTRODES HAVING CONTROLLED DENDRITIC GROWTH AND METHODS FOR MAKING AND USING SAME

(71) Applicant: Indiana University Research and Technology Corporation, Indianapolis, IN (US)

(72) Inventor: Jian Xie, Carmel, IN (US)

(73) Assignee: Indiana University Research and Technology Corporation, Indianapolis, IN (US)

(*) Notice: Subject to any disclaimer, the term of this patent is extended or adjusted under 35 U.S.C. 154(b) by 0 days.

(21) Appl. No.: 15/788,384

(22) Filed: Oct. 19, 2017

(65) Prior Publication Data

US 2018/0102535 A1 Apr. 12, 2018

Related U.S. Application Data

(63) Continuation of application No. 13/474,179, filed on May 17, 2012, now Pat. No. 9,853,283.
(Continued)

(51) Int. Cl.
*H01M 4/1395* (2010.01)
*H01M 10/052* (2010.01)
(Continued)

(52) U.S. Cl.
CPC .......... *H01M 4/1395* (2013.01); *B82Y 30/00* (2013.01); *H01M 10/052* (2013.01);
(Continued)

(58) Field of Classification Search
CPC .................................................. H01M 4/0404
See application file for complete search history.

(56) References Cited

U.S. PATENT DOCUMENTS

| 4,298,697 A | 11/1981 | Baczek et al. |
| 4,622,277 A | 11/1986 | Bedder et al. |

(Continued)

FOREIGN PATENT DOCUMENTS

| CN | 1363124 | 8/2002 |
| CN | 101680106 | 3/2010 |

(Continued)

OTHER PUBLICATIONS

Kumar, B., et al., A Solid-State, Rechargeable, Long Cycle Life Lithium-Air Battery II J. Electrochem. Soc., 157, 1, A50-A54, (2010).
(Continued)

*Primary Examiner* — Stephan J Essex
(74) *Attorney, Agent, or Firm* — Fish & Richardson P.C.

(57) ABSTRACT

A device for extending the life of a battery, including an electrode having a metal portion, wherein the metal portion is selected from the group including lithium, calcium, magnesium, sodium, potassium and combinations thereof, an electrolyte permeable membrane, and a metal dendrite seeding material disposed between the electrode and the membrane. The electrode, the membrane and the metal dendrite seeding material are positioned in an electrolyte matrix. At least one dendrite extends from the electrode toward the electrolyte permeable membrane combines with at least one dendrite extending from the dendrite seeding material.

19 Claims, 9 Drawing Sheets

Related U.S. Application Data

(60) Provisional application No. 61/565,101, filed on Nov. 30, 2011, provisional application No. 61/498,192, filed on Jun. 17, 2011, provisional application No. 61/486,946, filed on May 17, 2011.

(51) Int. Cl.
    *H01M 10/0566*    (2010.01)
    *H01M 2/16*    (2006.01)
    *B82Y 30/00*    (2011.01)
    *H01M 50/409*    (2021.01)
    *H01M 50/449*    (2021.01)

(52) U.S. Cl.
    CPC ..... *H01M 10/0566* (2013.01); *H01M 50/409* (2021.01); *H01M 50/449* (2021.01); *Y02E 60/10* (2013.01)

(56) References Cited

U.S. PATENT DOCUMENTS

| | | | |
|---|---|---|---|
| 5,427,872 | A | 6/1995 | Shen et al. |
| 5,434,021 | A * | 7/1995 | Fauteux ............. H01M 4/13 429/213 |
| 6,558,849 | B2 | 5/2003 | Cheiky et al. |
| 6,777,135 | B2 | 8/2004 | Okada et al. |
| 2002/0031701 | A1 | 3/2002 | Kawakami et al. |
| 2002/0182499 | A1 | 12/2002 | Cheiky et al. |
| 2003/0124429 | A1 | 7/2003 | Okada et al. |
| 2003/0157408 | A1 | 8/2003 | Sun |
| 2004/0167014 | A1 | 8/2004 | Yan et al. |
| 2005/0008920 | A1 | 1/2005 | Kohyama et al. |
| 2006/0078784 | A1 | 4/2006 | Liu et al. |
| 2006/0093885 | A1 | 5/2006 | Krusic et al. |
| 2007/0180688 | A1 | 8/2007 | Kawakami et al. |
| 2010/0099838 | A1 | 4/2010 | Takeda et al. |
| 2010/0159353 | A1 | 6/2010 | Ohgi et al. |
| 2010/0193362 | A1 | 8/2010 | Warabisako et al. |
| 2010/0193365 | A1 | 8/2010 | Lopatin et al. |
| 2010/0216026 | A1 | 8/2010 | Lopatin et al. |
| 2010/0266901 | A1 | 10/2010 | Johnson |
| 2010/0323269 | A1 | 12/2010 | Nakai et al. |

FOREIGN PATENT DOCUMENTS

| | | |
|---|---|---|
| CN | 101682048 | 3/2010 |
| JP | 6-52891 | 2/1994 |
| JP | H06-168737 | 6/1994 |
| JP | 7-14608 | 1/1995 |
| JP | H10-312827 | 11/1998 |
| JP | 2002-343437 | 11/2002 |
| JP | 2004002658 | 1/2004 |
| JP | 2007529404 | 10/2007 |
| JP | 2008-276989 | 11/2008 |
| JP | 2010-199083 | 9/2010 |
| JP | 2010-219012 | 9/2010 |
| JP | 2011065984 | 3/2011 |
| KR | 10 20070082931 | 8/2007 |
| RU | 2279159 C1 | 6/2006 |
| WO | WO 2001/063687 | 8/2001 |
| WO | WO 2008/149815 | 12/2008 |
| WO | WO 2009/124893 | 10/2009 |

OTHER PUBLICATIONS

Kumar, B., et al., Cathodes for Solid-State Lithium-Oxygen Cells: Roles of Nasicon Glass-Ceramics II, J. Electrochem. Soc., 157, 5, A611-616, (2010).

Zhang, T., et al., Li/Polymer Electrolyte/Water Stable Lithium-Conducting Glass Ceramics Composite for Lithium-Air Secondary Batteries with an Aqueous Electroly le II, J. Electrochem. Soc., 155(12)A965-A969, (2008).

Japan Patent Office, English translation of the Notice of Reasons for Rejection issued in Japanese Appl. No. 2017-180838 dated Jul. 25, 2018, 10 pages.

India Intellectual Property Office, Examination Report for related India Application No. 9527/DELNP/2013 dated Apr. 18, 2019, 7 pages.

Korean Intellectual Property Office, English translation of the first office action issued in corresponding KR Appl. No. 10-2013-7033351 dated Jun. 21, 2018, 11 pages.

Australian Patent Office, Patent Examination Report No. 1 for AU Application No. 2012255242, dated Sep. 2, 2016, 5 pages.

Chinese Office Action issued in corresponding CN Application No. 201280035599.1 dated Jun. 26, 2015, 38 pages (English translation).

Columbian Office Action (English translation), Application No. 13-280262, dated Sep. 10, 2014, 12 pages.

Columbian Office Action (English translation), Resolution No. 2744, Application No. 13-280262, dated Jan. 30, 2015, 15 pages.

Columbian Patent Office, Direction of New Creations Official Action, Columbian Patent Application National Phase No. 15-049,680, dated May 17, 2016, 18 pages (English translation).

Columbian Patent Office, English Translation of Direction of New Creations, Columbian Patent Application No. 14-250.445, dated May 23, 2016, 11 pages.

European Patent Office, Communication pursuant to Article 94(3) EPC, Application No. 12 786 692.9, dated Feb. 12, 2015 4 pages.

European Patent Office, Communication pursuant to Article 94(3) EPC, Application No. 12 786,692.9, dated Oct. 8, 2015, 4 pages.

Gireaud, L., et al., Electrochemistty Communications (2006), 8(10), 163 9-1649.

Intellectual Property Office of Singapore Search Report issued in Application No. 10201405466R dated Dec. 10, 2015, 9 pages.

Japan Patent Office, English translation of Notice of Reasons for Rejection issued in corresponding Japanese Patent Application No. 2014-511540 dated Mar. 23, 2016, 10 pages.

Japan Patent Office of the Notice of Reasons for Rejection issued in corresponding Appl. No. 2014-511540 dated Nov. 8, 2016, 6 pages (English translation).

Russian Federation Patent Office, Federal Service on Industrial Property, English Translation of the Notification of violation of the requirement of unity of invention, Russian Patent Application No. 2013155897/07(087169), issued Apr. 14, 2016, 4 pages (English translation).

Russian Patent office, English Translation of Decision on Grant for Application No. 2013155897, dated Jul. 26, 2016, 19 pages.

Vietnamese Office Action Application No. 1-2013-03802, dated Jan. 16, 2014, 2 pages. (English translation).

* cited by examiner

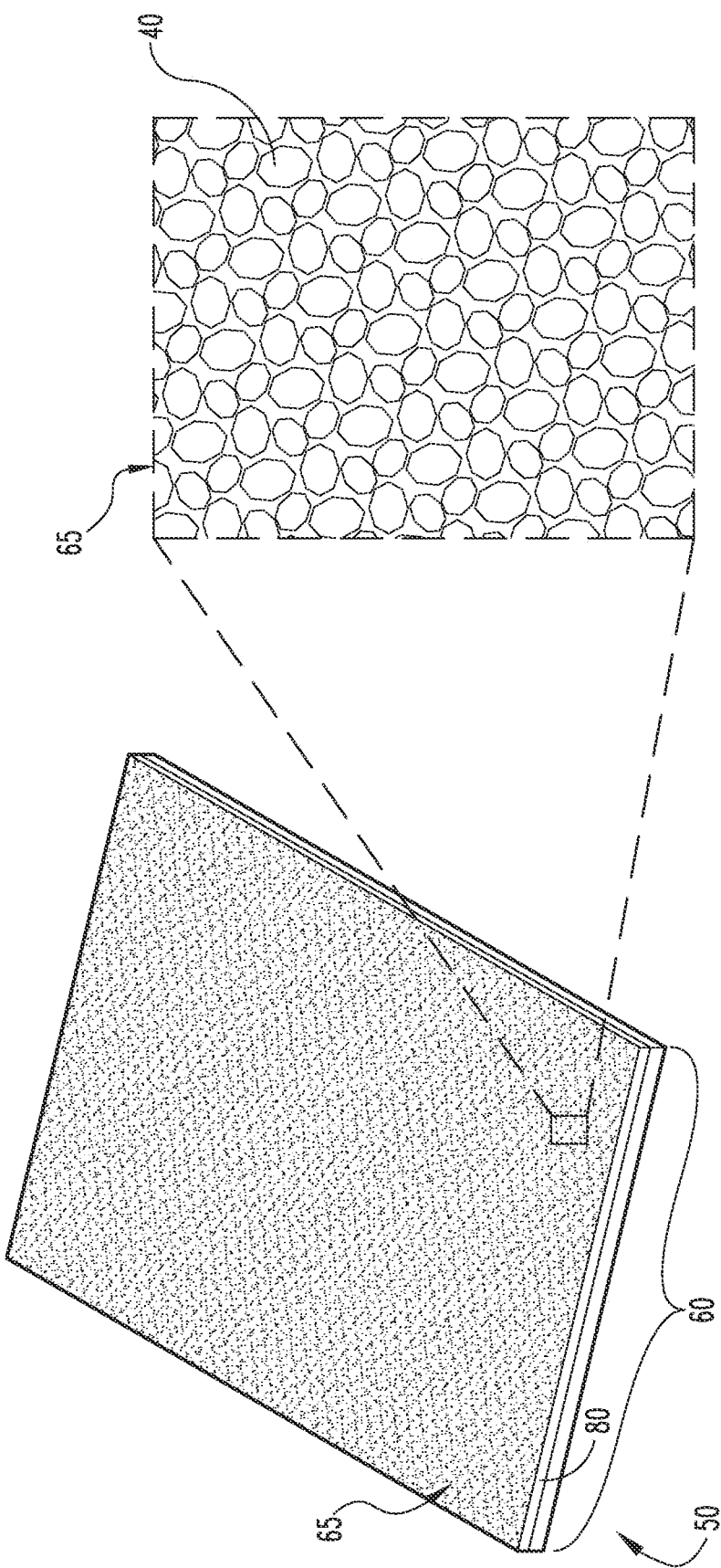

RECHARGEABLE ALKALINE METAL AND ALKALINE EARTH ELECTRODES HAVING CONTROLLED DENDRITIC GROWTH AND METHODS FOR MAKING AND USING SAME

CROSS-REFERENCE TO RELATED APPLICATION

This application is a continuation application of and claims priority to U.S. application Ser. No. 13/474,179, filed on May 17, 2012, which claim priority to U.S. Provisional Application No. 61/486,946, filed on May 17, 2011, to U.S. Provisional Application No. 61/498,192, filed Jun. 17, 2011, and to U.S. Provisional Application No. 61/565,101, filed on Nov. 30, 2011, all of which are incorporated by reference herein in their entireties.

BACKGROUND

The use of Lithium metal as an anode to build a rechargeable Lithium cell or battery system with the highest anode-specific capacity has long been desired. However, the growth of Li-metal dendrites gives rise to serious technical barriers for developing such a battery. Recently, modified versions of the Li metal battery, such as the Lithium ion battery, have been introduced with some success. However, the current modified versions possess limitations and inefficiencies that would not arise with a cell that uses Lithium metal as an anode.

Typically, a Lithium metal cell includes an anode and a cathode separated by an electrically insulating barrier or 'separator' and operationally connected by an electrolyte solution. During the charging process, the positively charged lithium ions move from the cathode, through the permeable separator, to the anode and reduce into Li metal. During discharge, the Li metal is oxidized to positively charged lithium ions which move from the anode, through the separator, and onto the cathode, while electrons move through an external load from the anode to the cathode, yielding current and providing power for the load. During repeated charges and discharges, Lithium dendrites begin to grow from on the surface of the anode. Dendritic lithium deposits, sometimes called mossy lithium, eventually tear through the separator and reach the cathode causing an internal short and rendering the cell inoperable. Lithium dendrite formation is inherently unavoidable during the charging and discharging processes of Li-metal cells. Thus, there remains a need for a lithium electrode cell system that does not suffer the effects of dendrite growth while simultaneously maintaining the cycle ability, ionic conductivity, voltage and specific capacity of the cells. The present novel technology addresses these needs.

DESCRIPTION OF THE DRAWINGS

FIG. 2A is a perspective view of the separator of FIG. 1.

FIG. 2B is an exploded view of the separator surface of FIG. 2.

DETAILED DESCRIPTION

Figure 1:
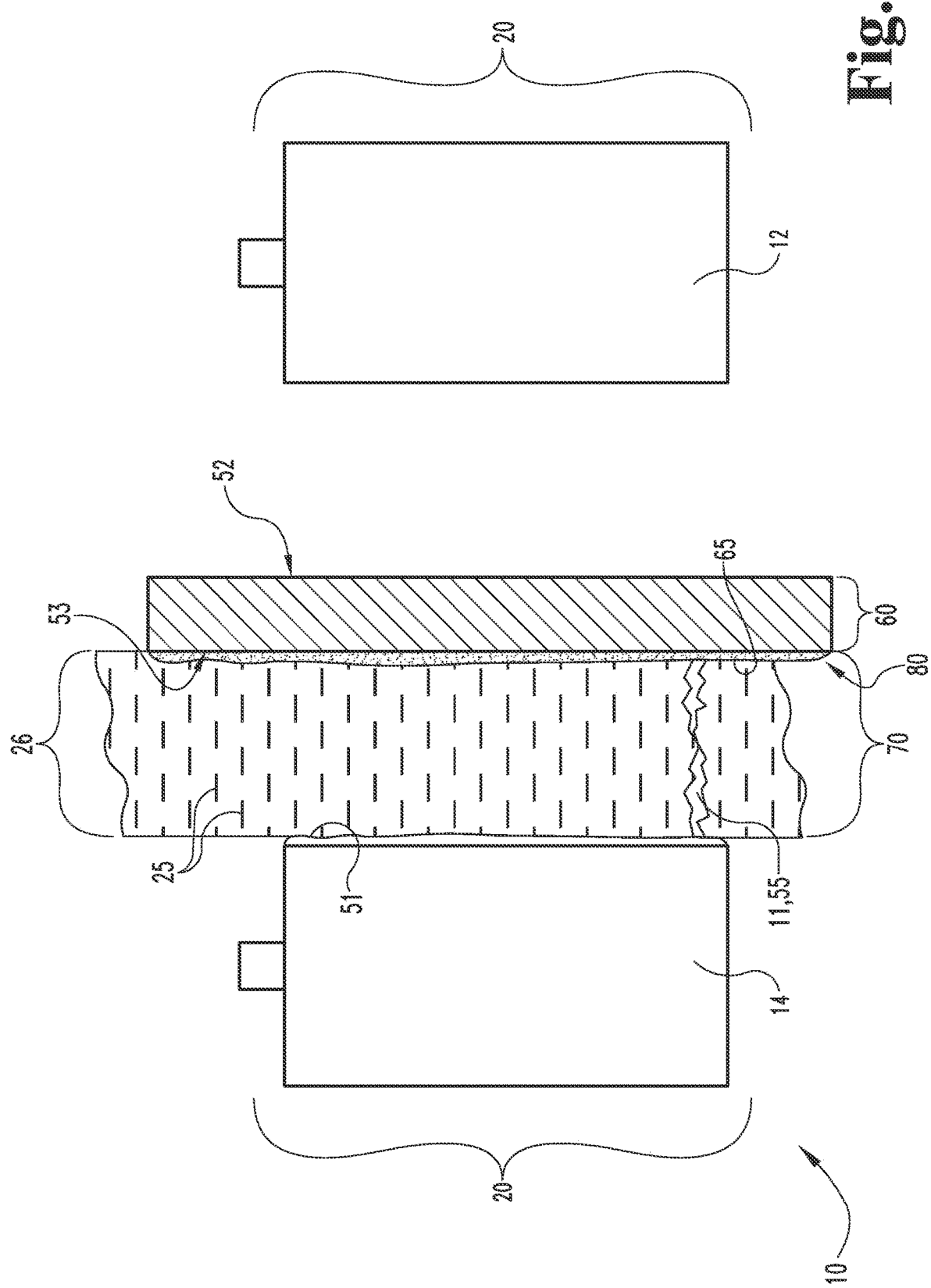
FIG. 1 is schematic view of a lithium ion cell according to a first embodiment of the present novel technology.
Figure 3A:
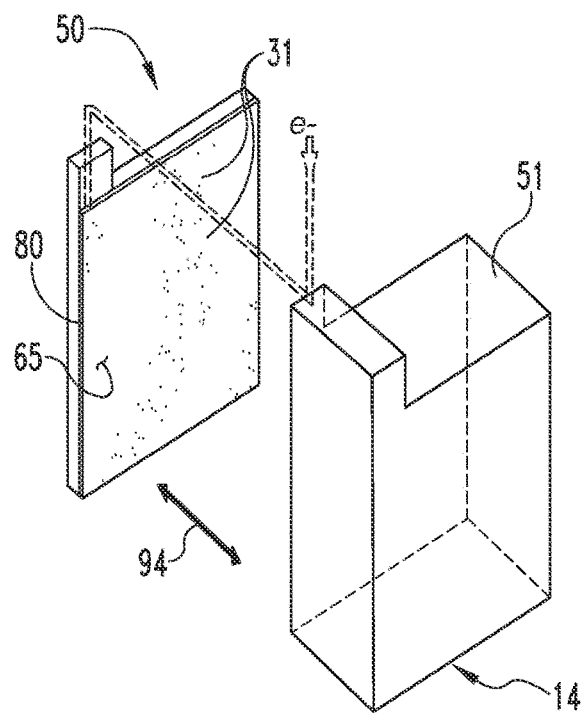
FIG. 3A is a first perspective view of a composite electrode of FIG. 1.
Figure 3B:
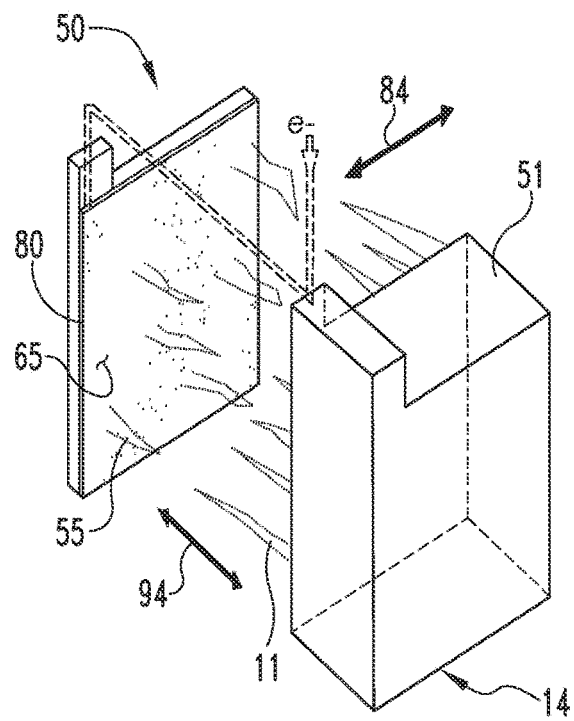
FIG. 3B is a second perspective view of a composite electrode of FIG. 1.
Figure 3C:
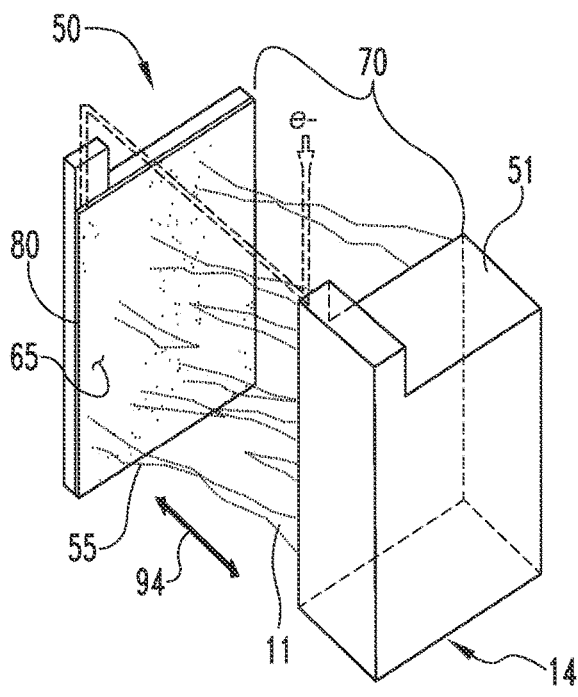
FIG. 3C is a third perspective view of a composite electrode of FIG. 1.
Figure 3D:
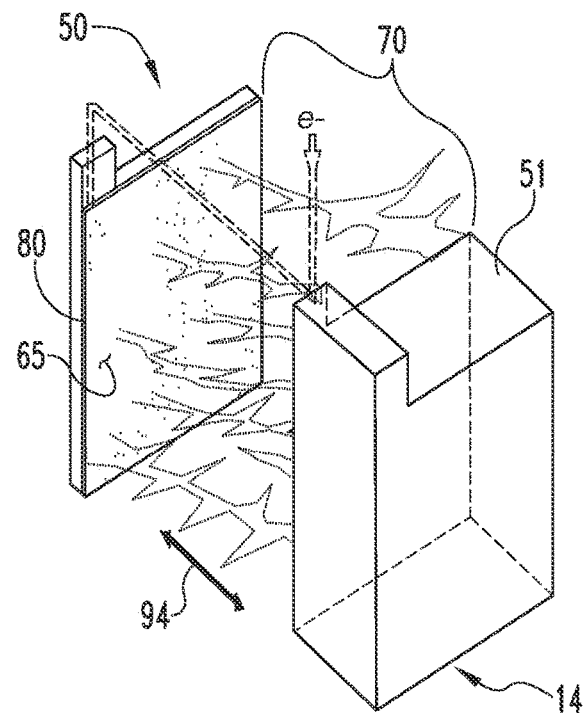
FIG. 3D is a fourth perspective view of a composite electrode of FIG. 1.

For the purposes of promoting and understanding of the principles of the novel technology and presenting its currently understood best mode of operation, reference will now be made to the embodiments illustrated in the drawings and specific language will be used to describe the same. It will nevertheless be understood that no limitation of the scope of the novel technology is thereby intended, with such alterations and further modifications in the illustrated novel technology and such further applications of the principles of the novel technology as illustrated therein being contemplated as would normally occur to one skilled in the art to which the novel technology relates.

As shown in FIGS. 1-10, the present novel technology relates to a rechargeable lithium metal electrochemical storage cell 10 having lithium metal electrodes 20. Referring to FIG. 1, a rechargeable lithium electrode cell 10 is shown with a Li metal cathode portion 12 and Li– metal anode portion 14. Separator 50 is positioned between the anode 14 and cathode 12. Separator 50 is typically coated with a layer 80 of functionalized nanocarbons particles 40. Separator 50 includes an anode facing side 53 and a cathode facing side 52, and is typically coated with a thin or very thin film 80 of the functionalized nanocarbon (FNC) particles 40, more typically about 0.1 µm thick, and typically oriented facing the surface 70 of the Li-metal electrode 20. Gap 26 is filled with an electrolyte 25 positioned between the Li-metal electrode 20 and the FNC-coated separator 60. The functionalized nanocarbon particles 40 typically have Li+ ions immobilized on the surface 65 of the layer 80 of nanocarbon particles 40. The FNC film 80 is electrically connected to the Li-metal electrode 20. When the Li-metal electrode 20 is charged, Li dendrites 11 extend from the surface 70 of the Li metal electrode 20 toward the FNC-coated separator 60. Simultaneously, dendrites 55 extend from the surface 65 of the FNC film 80 toward the surface 70 of the Li-metal electrode 20. The dendrites 55 grow in the through plane direction 94 of the Li metal electrode 20 and FNC coated separator 60.

Figure 5:
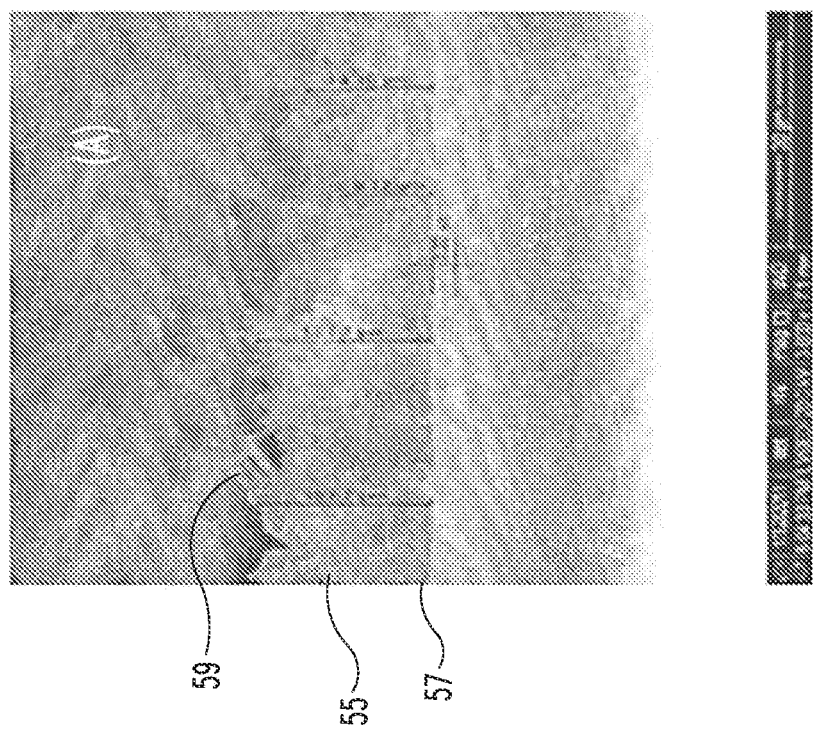
FIG. 5 is an enlarged elevation view of a dendrite growing from an electrode surface of FIG. 1.
Figure 7:
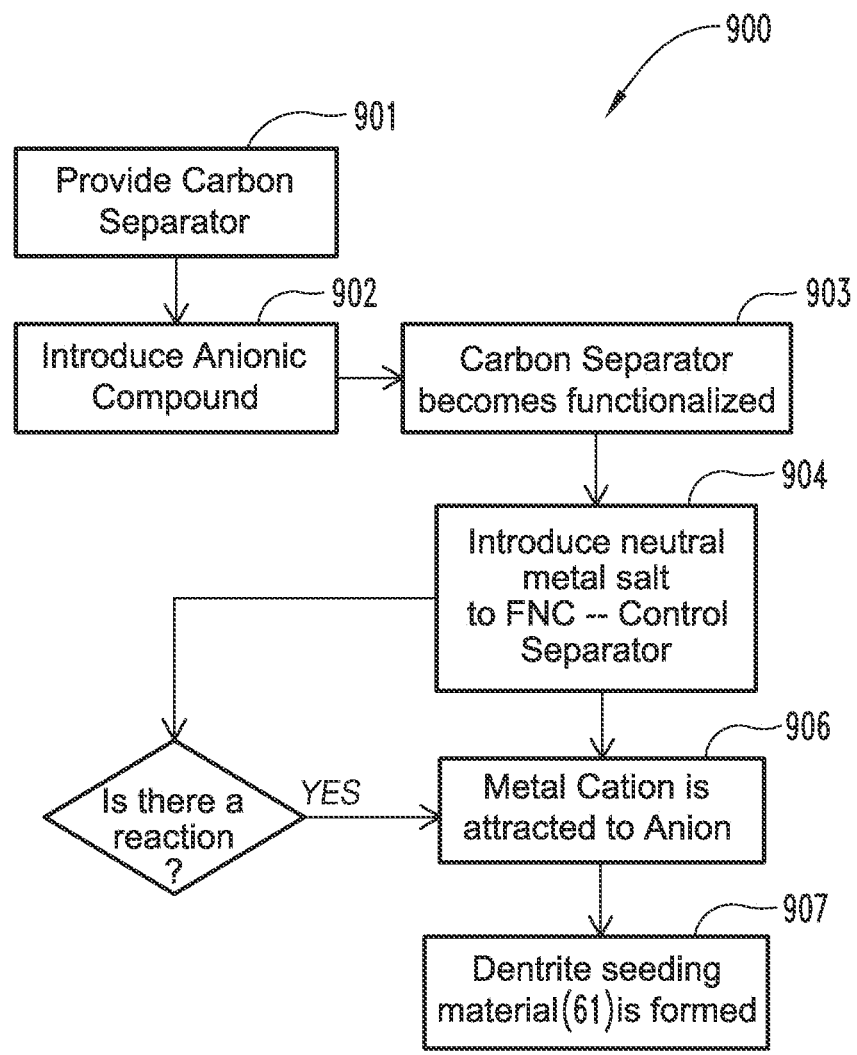
FIG. 7 is a process diagram a third embodiment of the present novel technology, showing of a method to form dendrite seeding material.
Figure 8:
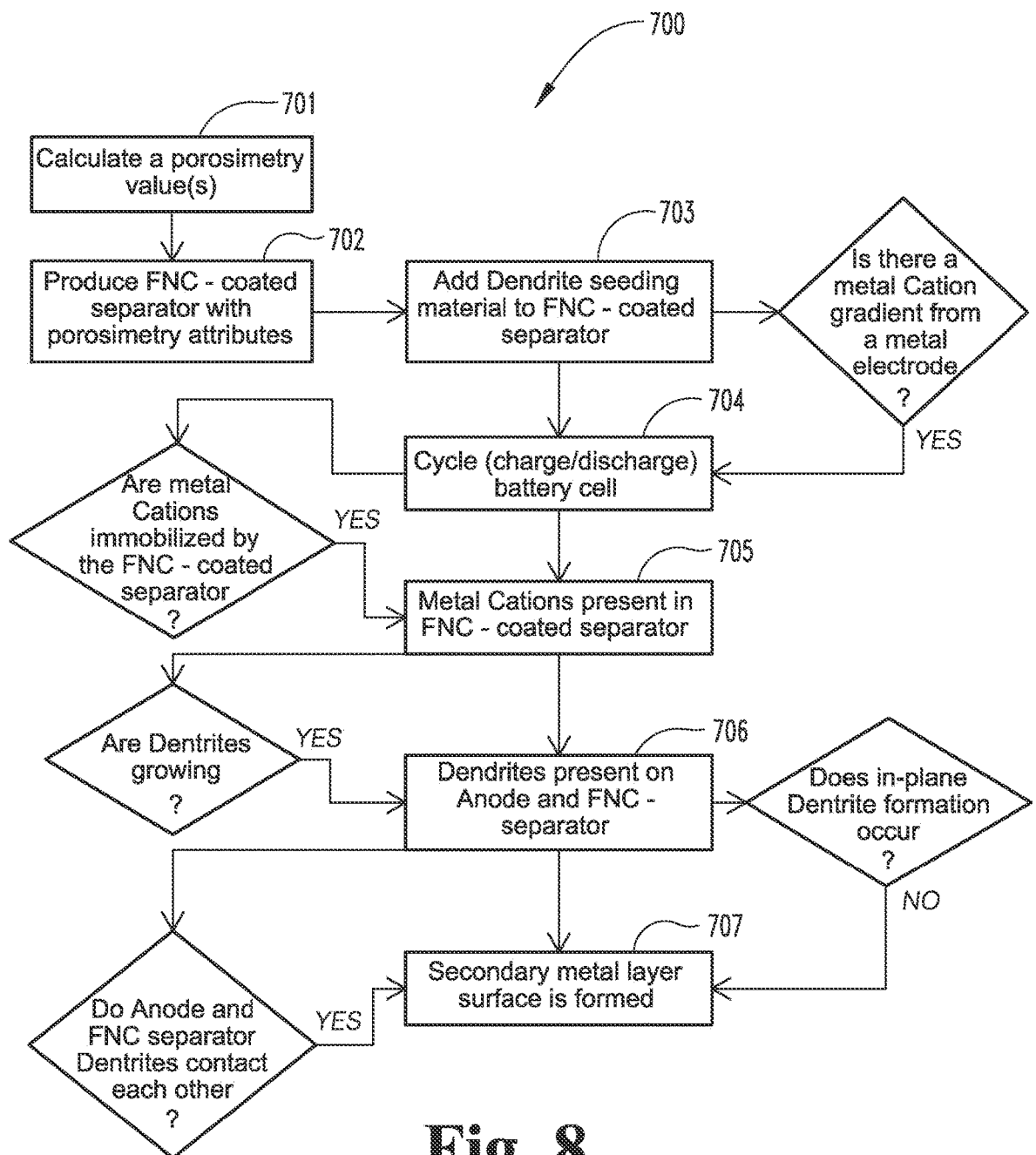
FIG. 8 is a process diagram a fourth embodiment of the present novel technology, showing of a method of controlling metal dendrite growth.

Referring to FIG. 5, growth of dendrites 11, 55 is driven by the potential difference (ΔE) between the tip (Et) 59 and the base (Eb) 57 of the respective dendrites 11, 55. With cycling, dendrites 11, 55 continue extending toward each other; eventually, the dendrites 11, 55 touch each other and the potential difference (ΔE) dendrite 11, 55 is approximately zero because the FNC film 80 and the Li-metal electrode 20 have the same potential. Consequently, dendrite 11, 55 growth is retarded or stopped along the through plane direction 94. In the subsequent cycles, dendrites 11, 55 may grow in a direction perpendicular to the major axis of the respective dendrite 11, 55 and parallel to the plane of the Li-metal electrode 20, also referred as the in-plane direction 84, which prevents dendrites 11, 55 from piercing through permeable or selectively permeable membrane 50, as shown in FIGS. 3A-3D. Eventually, a Li secondary surface 70 may form, from the intersection of the Li dendrites 11, 55. Thus, a composite Li metal electrode 20 is formed in which an Li electrode 20 is assembled with the thin carbon layer 80.

While the lithium is typically specifically discussed herein as the electrode metal, the storage cell 10 may alternately include other alkaline earth and/or alkaline metal elements and combinations thereof as the electrode materials.

Two types of cell exemplary configurations for exploiting the Li-metal dendrite/electrode system include a symmetric cell 400 in which a Li-metal electrode 420 is used as both the anode 414 and the cathode 412, having the configuration of Li/polymer/Li (anode/electrolyte/cathode=A/E/C), enabling Li-dendrite mechanism study or Li-polymer battery systems; and an asymmetric cell 500 in which Li metal is the anode 514 and a different material is selected for the cathode 512, such as Li/polymer electrolyte/V2O5, Li/liquid electrolyte/graphite, Li/polymer electrolyte/graphite, and Li/polymer electrolyte/FePO4. The symmetric cell 400 provides a better medium for Li-metal dendrite growth and can accelerate the cycle testing, while the asymmetric cell 500 better approximates field applications.

Dendrite growth, as shown in FIG. 5, is fundamentally unavoidable because the metallurgic characteristics of Li-metal surfaces result in surface imperfections of Li-metal electrodes after the application of either mechanical stress or the plating/stripping cycles. While configurations known in the art focus solely on stopping dendrite 11 growth, the novel cell design 10 focuses on controlling the direction of the Li-metal dendrite 11, 55 growth.

Figure 9:
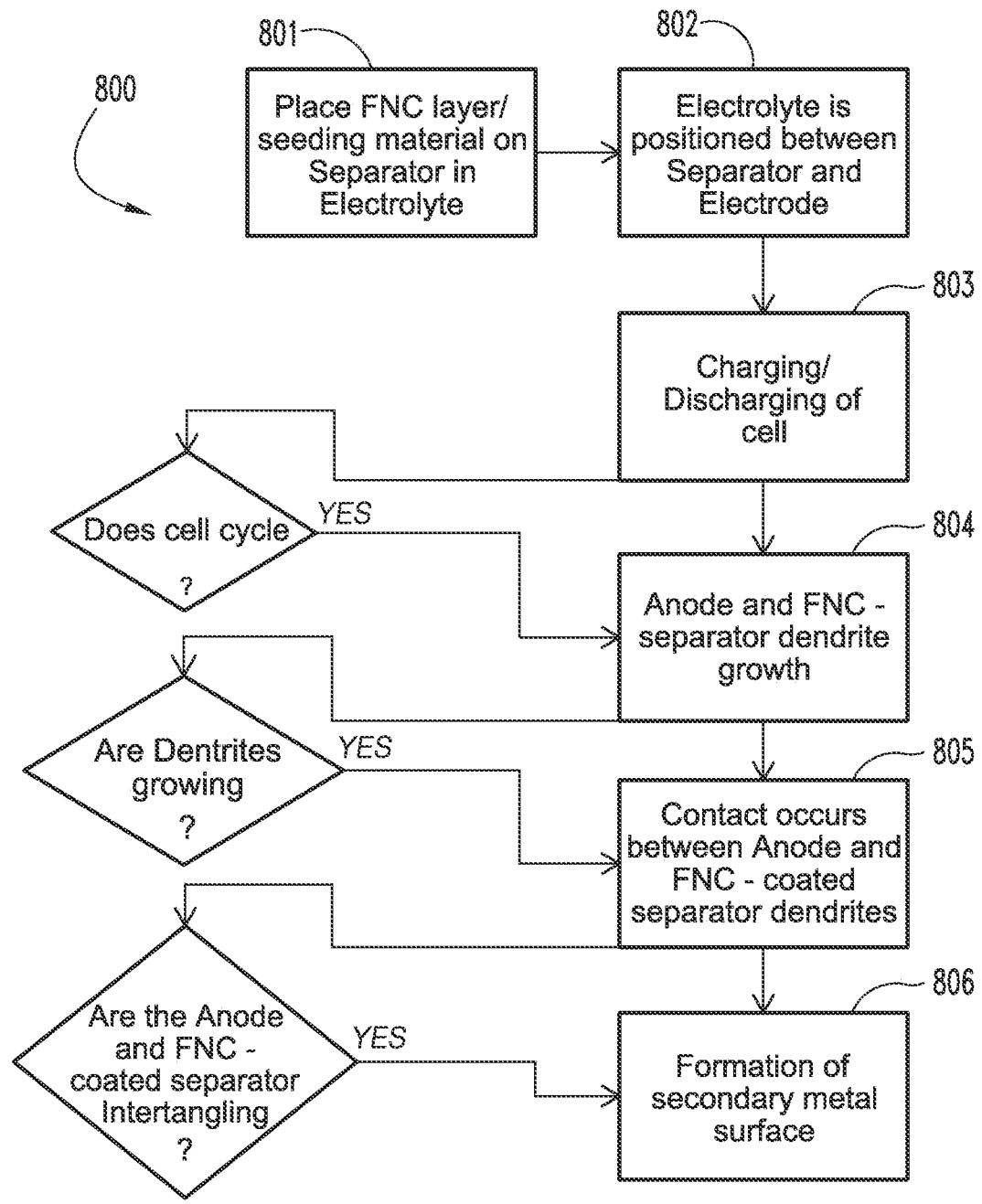
FIG. 9 is a process diagram a fifth embodiment of the present novel technology, showing of a method of extending the life a cell.
Figure 10:
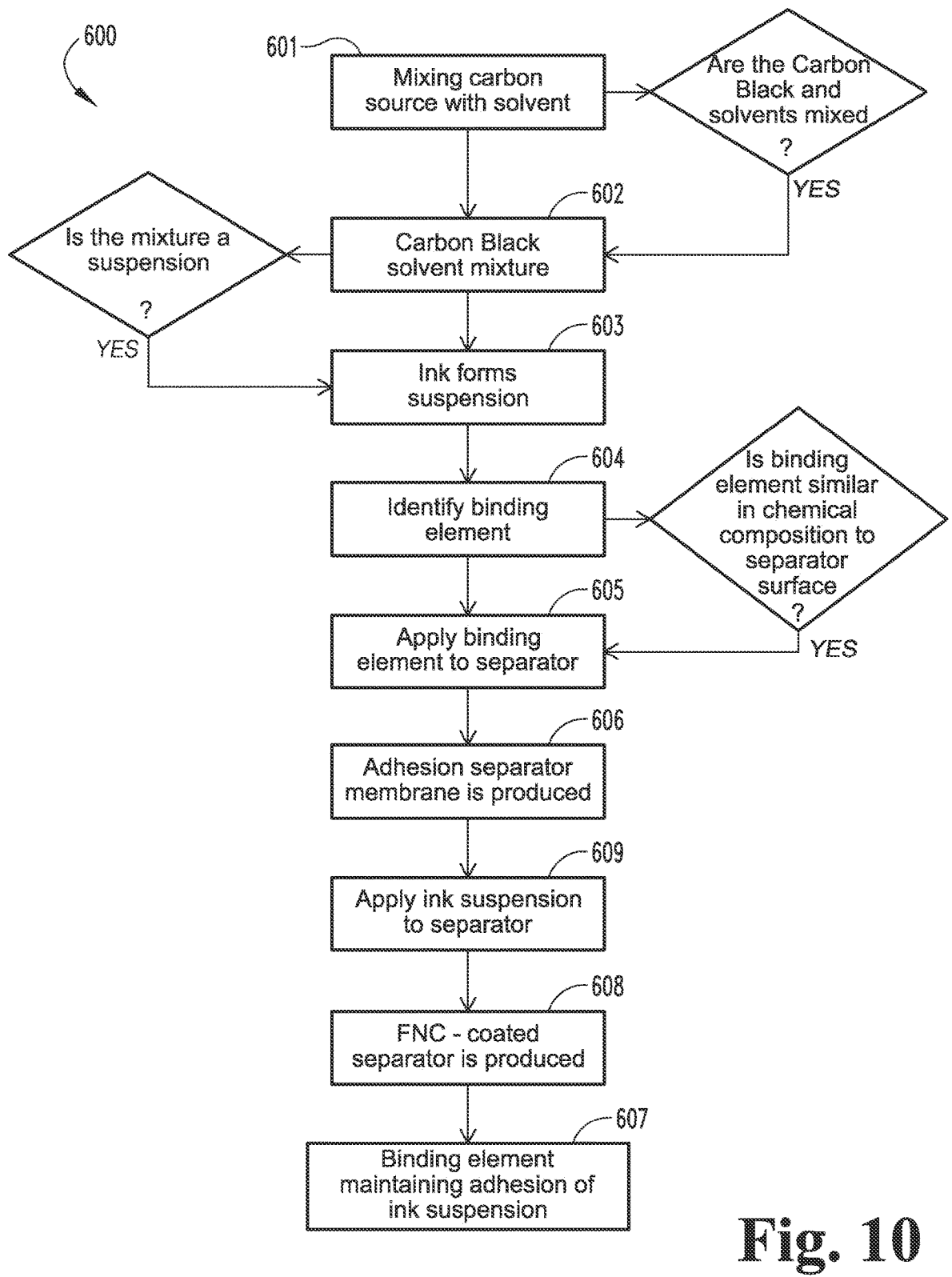
FIG. 10 is a process diagram a sixth embodiment of the present novel technology, showing of a method of producing an FNC-coated separator.

As described in FIG. 9, one implementation 800 of the novel electrode 20 may have a carbon-coated layer of functionalized nanocarbon particles (FNC) 80 on a separator 50 that is positioned 801 in an electrolyte 25 and grows 803 Li dendrites 11, 55 simultaneously from the surface 51 of the Li metal electrode 20 and the surface 65 of the FNC coated separator 60. An electrolyte 25 is placed 802 in the gap 26 the between the electrode 20 and FNC-coated separator 60. The dendrites 11, 55 grow 803 after repeated charging and discharging 804 of the cell 10. Dendrites 11, 55 contact each other 805 and when contact occurs, the dendrites 11, 55 stop extending in the through plane direction 94 due to the zero potential difference that results from contact. The control of dendrite growth direction 800 occurs by contact 805 between the FNC coated separator dendrites 55 and the electrode dendrites 11. After multiple combinations of dendrites 11, 55 the formation 806 of a Li– secondary Li surface 70 results.

The establishment of a zeroing potential difference gives the rechargeable Li-metal electrode 20 a high specific capacity, high cycle ability, and high safety. Accordingly, the rechargeable lithium metal electrode system 10 may be implemented in many kinds of Li batteries including Li-polymer, Li-air and Li-metal oxide cells and battery systems as well as any other cells or battery systems in which Li metal anodes 14 are used, and yield benefits for electronics, electric vehicles and hybrid electric vehicles, large-scale energy storage and the like.

Typically, a challenge for developing a high specific capacity and rechargeable Lithium metal electrode 20 for different Li batteries (i.e. Li polymer, Li-air and Li-ion, etc), has been stopping electrode dendrite 11 growth during the cycling 803. The Li-metal electrode 20 has an inherent metallurgic tendency to form dendrites 11, and dendrite 11 growth is driven by the potential difference between the base 57 and the dendrite tip 59. Thus, Li electrode dendrite 11 growth is unavoidable. However, the instant system 800 incorporates, rather than avoids, the dendrite growth mechanism.

In one embodiment, a rechargeable Li-metal electrode 220 is used in other Li battery systems, such as Li-polymer and Li-air and may be fabricated by coating the FNC layers 280 on the polymer electrolyte membranes 200, which are used as the electrolyte 225 in both Li-polymer batteries and Li-air batteries. These FNC-coated polymer electrolytes 225 are typically incorporated as the interlayer 280 and assembled into a soft packed Li-air cell 285. Such polymer electrolyte membranes 260 may include those of poly(ethylene oxide) (PEO), poly(vinylidene fluoride) (PVdF), poly (acrylonitrile) (PAN), and the other polymer electrolytes, which are widely used for both Li-polymer batteries and Li-air batteries.

Additionally, many modes of producing the FNC coated separator 60 are available. The FNC layer 80 plays a role in the novel Li-metal electrode 20 because the immobilized Li+ ions 30 in the FNC layer 80 serve as 'seeds' 31 for Li-metal dendrite 55 formation on the FNC layer 80. The FNC layer 80 is typically porous, allowing the FNC aggregates to be bonded 605 together by the binder network 604 to form a rigid structure 606 to hold 607 the integrity of the layer 80. The layer 80 is typically very thin with four main properties: 1) good pore structure to facilitate the passage of Li+ ions therethrough, 2) high electric conductivity to reduce internal impedance, 3) high coverage of Li+ ions 30 over the nanocarbon surface 65 for easy formation of Li metal dendrites 55, and 4) good adhesion to a polymer separator 50 or a polymer electrolyte membrane. All of these properties are similar to those for the catalyst layer in the fuel cell, (i.e. a porous layer for gas and water diffusion, electric conductivity necessitated for gas reactions, $SO_3$- coverage for proton conduction, and good adhesion of the catalyst layer on the polymer electrolyte membrane for durability). The thinner the FNC layer 80, the less the loss of specific capacity of the Li-metal electrode 20.

The morphology of the FNC layer 80 depends on how the layer is fabricated 600. Such techniques of applying 609 the layer 80 include (1) spraying, (2) machine blade-coating, (3) brush hand-painting, and the like. Carbons may be selected from sources including carbon blacks, nanographites, graphenes, and the like. It has been found that the higher the degree of graphitization, the higher the chemical stability. The nanocarbon particles 40 may be made from carbon black, which is inexpensive, but is an amorphous structure rather than a graphite structure. Graphene may also be used and possesses unique properties such as high electronic conductivity, high modulus, and high surface area.

The morphology of the FNC layer 80 is also influenced by the ink formulation. To make a thin carbon layer, the first step is to mix 601 the carbon source with solvents to make a uniformly dispersed suspension 603. To form such a well-dispersed carbon ink, solvent type is carefully selected based on polarity (i.e. dielectric constant) and their hydrophobicity in order to match those of the carbon aggregates and the binders. This mixture 602 is also called 'ink formulation'. The type of carbons and solvents in an ink will affect the morphology of the thin FNC layer 80. The type of binder 33 also affects the adhesion of the carbon layer 80 on the separator 50. Typically, the binder 33 has a similar chemical structure to the separator/electrolyte membrane 50 so that they can be fused together 605 through hot pressing or other techniques to form a well-bonded interface 62 between the carbon layer 80 and the separator/electrolyte membrane 50.

The immobilized Li+ ions 30 over the surface of nanocarbon particles 40 serve as the 'seeds' 31 for Li dendrite 55 formation on the FNC-coated separator 60. Immobilization of the Li+ ions 30 is carried out by formation 900 of a dendrite seeding material 61, such as by diazonium reaction or similar means 902 on an appropriate 901 carbon separator 50 to chemically attach an $SO_3H$ group 902 onto the carbon surface 65, allowing the carbon separator 50 to become functionalized 903. Then, attached $SO_3H$ exchanges 906 with Li+ ions 30 to immobilize the Li+ ions 30 onto the surface 65. Thus, a dendrite seeding material 61 is formed 907. The dendrite seeding material 61 is typically carbonaceous, but may also be a metal substrate, such as Li, Na, K, Al, Ni, Ti, Cu, Ag, Au, and combinations thereof. The seeding material 61 may also be a functionalized metal substrate, such as a self-assembled monolayer structure comprised of Au with a thiol-terminated organic molecule that contains at least one function group, such as SO3−M+, COO−M+, and NR3+X−, an electrically conductive organic polymer, such as polyacetylene, polyphenylene vinylene, polypyrrole, polythiophene, polyaniline, and plypohenylene sulfide, or a functionalized electrically conductive organic polymer, wherein the functional groups are chemically bound to the polymer. These materials 61 may be deposited using conventional physical deposition techniques, such as mechanical layering, or physical vapor deposition techniques, such a sputtering, or the like.

The novel technology allows attachment 903 of different functional groups to the carbon surface 65, such as through the diazonium reaction and the like. In this reaction, the functional group Y is attached 903 onto the carbon surface 65 through the introduction 904 of a diazonium salt $XN_2C_6H_4$—Y (wherein Y=Sulfonate, SO3−M+, Carboxylate, COO−M+; and Tertiary amine, NR3+X−; etc.). The attachment of different chemical groups not only provides a platform for immobilizing Li+ ions 30 at the FNC surface 65, but also changes the surface energy of the carbon particles which can be used as a tool for adjusting the surface hydrophobicity of the carbon film 80, and is helpful for ink formulation 603. The adhesion 609 of the FNC layer to a separator/polymer electrolyte 50 influences the cycle life of the novel Li-metal electrode 20. A good interface 62 between the FNC layer 80 and the separator/electrolyte membrane 50 is typically formed 608. This mainly depends on the network of binders 33 in the FNC layer 80 and the techniques for the formation of the interface 62. Such a catalyst layer can withstand several thousand hours of long-term durability testing due, in part to the binder 33 in maintaining 607 the FNC layer 80 bound to the separator/electrolyte membrane 50. A TEM observation of such this catalyst/membrane interface 62 would show little or no delamination after approximately 2000 hours of durability testing. Hot pressing is one of techniques for fabrication, and the parameters of the hot pressing technique (i.e. temperature, pressure, and time) allow systematic control of the process.

The morphology (i.e. surface area, pore structure, and geometry) of the FNC layer 80 on the membrane 50 has a significant impact on the performance of the novel metal electrode 20. The FNC layer 80 porosimetry 81 (i.e. pore size, pore size distribution and pore volume) is a factor in controlling the direction of dendrite growth 700 because it influences the presence 705 of metal cations 30 on the FNC membrane surface 65 and the addition 703 of the dendrite seeding material 61. The pore structure typically allows metal ions 30 to pass through smoothly during cycling 704, but not to form dendrites inside the pores that would block the diffusion of the metal ions 30. Thus, determining 701 and production 702 of an appropriate FNC layer 80 with porosimetry 81 is useful in allowing for dendrite 11, 55 presence 706 and eventual formation 707 of a secondary metal layer 70. On the other hand, the FNC layer 80 has to adhere to a separator/electrolyte membrane 50 and the diffusion barrier (if there is any) from the formed interface 62 should be minimized.

Typically, the specific capacity of the rechargeable metal electrode 20 may be affected by varying the thickness 89 of the FNC film 80 against the thickness 29 of the Li metal electrode 20. The examples herein relate to the novel technology and various embodiments, and are not intended to limit the scope of the present novel technology to those modes and embodiments discussed herein.

Example 1

The effect of the different carbon-coated layers on the specific capacity of the Li metal composite electrode 20 was approximately calculated and is shown in Table 1. For instance, for the carbon-coated layer 80 with the 0.1 μm thickness, the corresponding specific capacity loss of Li metal electrode 20 is only 0.026%. Even for the thick FNC film 80, 4 μm, the corresponding loss of specific capacity is only 0.53%. Thus, the effects of the carbon-coated layer 80 on the specific capacity of the Li metal electrode 20 are negligible. The thin carbon-coated layer 80 retains the advantage of the high specific capacity of Li metal electrodes.

TABLE 1

| Thickness of Carbon Film (μm) | Thickness of Li Metal Electrode (mm) | Reduction of Li Metal Electrode Specific Capacity (%) |
| --- | --- | --- |
| 0.1 | 0.75 | 0.0133 |
| 1 | 0.75 | 0.1332 |
| 2 | 0.75 | 0.1332 |
| 3 | 0.75 | 0.1332 |
| 4 | 0.75 | 0.5305 |

Effect of thickness of carbon film on the Li metal electrode specific capacity. Therefore, carbon has been proven to be very stable in a wide potential window. The composite Li electrode having a very thin carbon film is very stable. Carbon black may be used in many battery systems (i.e. $Zn/MnO_2$), in particular, Li-ion batteries (as the anode) and Li—$SOCl_2$ batteries (as the carbon cathode).

Figure 4:
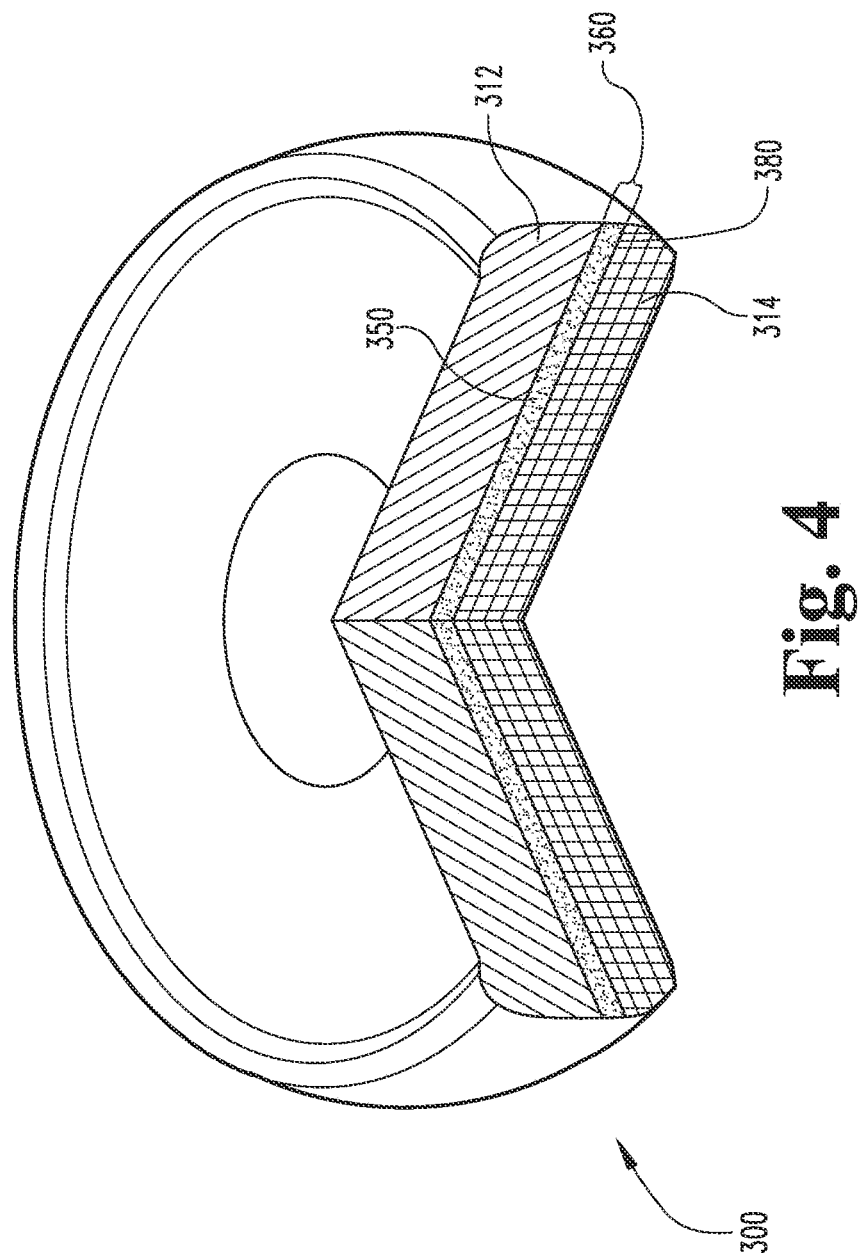
FIG. 4 is a perspective view of a second embodiment coin cell implementation of the present novel technology.

Referring to FIG. 4, The Li metal anode 14 was assembled together with a separator 350 (thickness=25 μm) coated with a thin nanocarbon layer 80 of functionalized carbon nanoparticles 340 (δ=3.2 μm) and a $LiPFeO_4$ cathode 312 into a coin cell 300 configuration using the electrolyte of 1.2 M $LiPF_6$ in ethylene carbonate/ethyl-methyl carbonate (EC: EMC=3:7). A coin cell using the same components, but without the nanocarbon coating layer 380, was used as a baseline for the comparison. One concern for using such a carbon coating layer 380 is whether the addition of the FNC layer 380 on the separator 350 would result in the increased internal impedance from the carbon layer 380 blocking the pores of the separator 350, thus hindering the diffusion of Li+ ions 330 through and, consequently, reducing the power performance of the cell 300. However, it is clear that coating the carbon layer 380 on the separator 350 did not cause an increase in the internal impedance of the cell 300, but instead gave rise to a slight impedance reduction. The Li/FNC cell 300 possesses a slightly higher discharge voltage than the baseline Li cell. Even after five hundred cycles, the same trend was observed. Noise was observed for the baseline cell, which was attributed to the formation of dendrites 355. In addition, the same phenomenon of reduction of internal impedance has been observed during the charging process.

The cell 300 was not balanced for capacity, and the capacity of the cell 300 was limited by the LiPFeO$_4$ cathode 312; a much higher capacity of the cell 300 is expected if an appropriate high energy density cathode is used (such as a $V_2O_5$ aerogel or an air cathode). The Li metal electrode 314 using an FNC layer 380 showed excellent cycleablity, approximately 84% capacity after 500 cycles. The estimated capacity decay rate of the novel Li metal electrode cell 300 after the first 45 cycles is only 0.026%/cycle. Based on this decay rate, the cycle life of such a cell can typically achieve at least 500, more typically at least 725 cycles, and still more typically at least 1000 cycles, with 80% capacity (death definition of a battery in electric vehicle (EV) applications). This decay rate (0.026%/cycle) of the novel Li metal electrode 320 in the coin cell 300 may be caused by the degradation of the LiFePO$_4$ cathode 312 because the coin cells 300 are sealed in ambient atmospheric pressure, which may allow the introduction of moisture into the cell 300. The moisture reacts with LiPF$_6$ to produce HF, which can react with LiFePO$_4$, causing the degradation. Therefore, the true decay rate of the novel Li metal electrode 320 should be much lower than 0.026%/cycle if the coin cell 300 is sealed, such as inside an Argon filled glovebox.

Example 2

Figure 6:
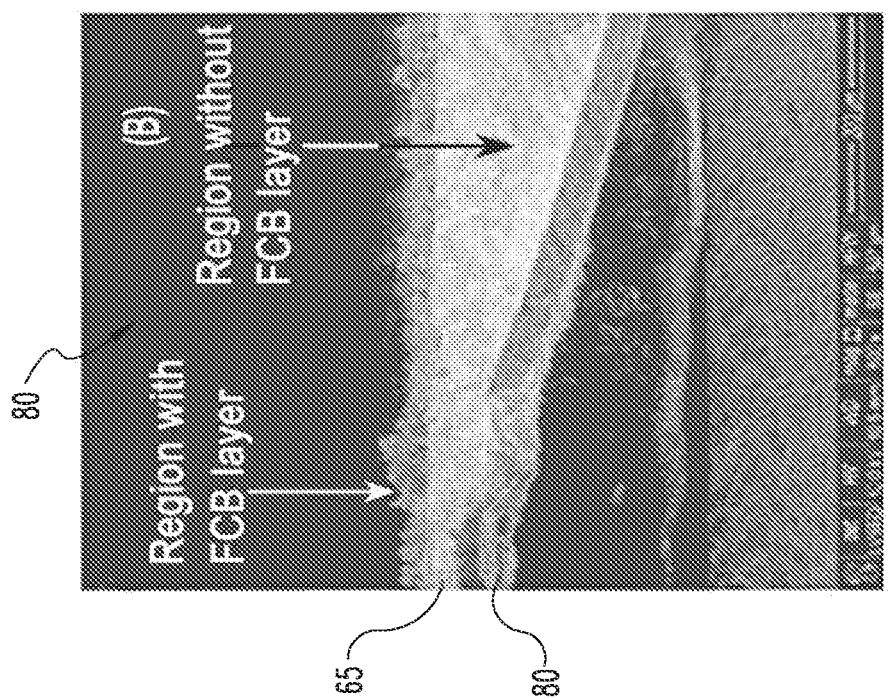
FIG. 6 is an exploded view of the surface of the separator of FIG. 1 as partially coated with FNC.

Referring to FIG. 6, an FNC-coated separator 60 was examined via SEM analysis after repeated cycling. Li metal dendrites 55 were observed on the surface 65 of the FNC-coated separator 60 facing the surface of the Li metal electrode 20. Moreover, the Li dendrites 55 formed a unitary layer instead of aggregating as loosely arranged dendrites. The thickness 89 of the FNC layer 80 was measured to be about 3 µm, while the Li dendrite 70 layer was around 20 µm thick. Referring to FIG. 6, and to further illustrate the function of the FNC layer 80 for inducing Li metal dendrite 55 formation, the separator 50 was coated with an FNC layer 80 on half the area of the surface, while the other half was not coated. No dendrites 55 formed on the non-coated region of the separator 50. No Li dendrites 55 were found on the opposite side of the FNC-coated separator 50. Some large size particles (50 µm or more) were observed seen underneath the separator 50; these large particles likely originated from the SEM conducting paste used to adhere the sample of the separator 50 on the SEM aluminum disc.

In another embodiment, the layer 80 formed over the electrochemical separator 50 to enable dendritic growth toward the metal anode 14 is a thin metallic layer 80. The dendrites 55 growing from the separator 50 contact dendrites 11 growing from the metal anode 14, shorting the circuit and thus preventing the dendrites 11 growing from the anode 14 toward the separator 50 to reach and pierce the separator 50. The anode 14 is typically lithium, but may likewise be sodium or the like. The metal layer 80 on the separator 50 is typically lithium, but may also be sodium or another electrically conductive metal, electrically conducting polymer, an organometallic matrix, functionalized electrically conducting polymer, or the like. More typically, the layer 80 is a non-reactive metal, such as Ni. The metal layer 80 on the separator 50 is typically formed thin enough such that its electrical resistivity is high, typically high enough such that the layer 80 is not easily electrically or otherwise degraded. Optionally, the thin metal layer 80 may be functionalized after deposition onto the separator 50.

While the novel technology has been illustrated and described in detail in the drawings and foregoing description, the same is to be considered as illustrative and not restrictive in character. It is understood that the embodiments have been shown and described in the foregoing specification in satisfaction of the best mode and enablement requirements. It is understood that one of ordinary skill in the art could readily make a nigh-infinite number of insubstantial changes and modifications to the above-described embodiments and that it would be impractical to attempt to describe all such embodiment variations in the present specification. Accordingly, it is understood that all changes and modifications that come within the spirit of the novel technology are desired to be protected.

What is claimed is:

1. A cell comprising:
   an anode;
   a cathode; and
   an electrode separator comprising:
      an anode-facing side and a cathode-facing side;
      an electrically insulating membrane; and
      an electrically-conductive layer on the anode-facing side, the electrically-conductive layer comprising a dendrite seeding material and functionalized carbon particles;
      wherein the electrode separator is disposed between the anode and the cathode, and wherein a gap is present between the electrode separator and the anode.

2. The electrode separator of claim 1, wherein the functionalized carbon particles are configured to immobilize a metal cation.

3. The electrode separator of claim 2, wherein the metal cation is a cation of a metal comprising lithium, sodium, potassium, aluminum, titanium, copper, silver, gold, calcium, magnesium, or combinations thereof.

4. The electrode separator of claim 1, wherein the functionalized carbon particles are configured to form dendrites on the porous layer.

5. The electrode separator of claim 1, wherein the functionalized carbon particles comprise carbon black, graphene, graphite, nanographite, amorphous carbon, or combinations thereof.

6. The electrode separator of claim 1, wherein the membrane comprises an electrically-conductive polymer.

7. The electrode separator of claim 6, wherein the electrically-conductive polymer comprises polyacetylene, polyphenylene vinylene, polypyrrole, polythiophene, polyaniline, or plypohenylene sulfide.

8. The electrode separator of claim 7, wherein the electrically-conductive polymer comprises a functionalized electrically-conductive polymer, wherein the functional groups are chemically bound to the polymer.

9. The electrode separator of claim 1, wherein the dendrite seeding material is carbonaceous.

10. The electrode separator of claim 1, wherein the dendrite seeding material comprises immobilized metal cations.

11. The electrode separator of claim 10, wherein the immobilized metal cations comprise a cation of a metal, the metal comprising lithium, sodium, potassium, aluminum, titanium, copper, silver, gold, calcium, magnesium, or combinations thereof.

12. The electrode separator of claim 1, wherein the functionalized carbon particles are configured to form dendrites on the porous layer.

13. The electrode separator of claim 1, wherein the functionalized carbon particles comprise carbon black, graphene, graphite, nanographite, amorphous carbon, or combinations thereof.

14. The electrode separator of claim 1, wherein the functionalize carbon particles comprise sulfonate, carboxylate, tertiary amine, or combinations thereof.

15. The electrode separator of claim 1, wherein the functionalized carbon particles are electrically conductive.

16. The electrode separator of claim 1, wherein the membrane comprises a polymer.

17. The electrode separator of claim 16, wherein the polymer comprises poly(ethylene oxide) (PEO), poly(vinylidene fluoride) (PVdF), or poly(acrylonitrile) (PAN).

18. The electrode separator of claim 1, wherein the membrane comprises an electrically-conductive polymer.

19. The electrode separator of claim 18, wherein the electrically-conductive polymer comprises polyacetylene, polyphenylene vinylene, polypyrrole, polythiophene, polyaniline, or plypohenylene sulfide.

* * * * *